Feb. 24, 1925.
H. F. CLAYTON
DRAFT GEAR FOR TRACTORS
Filed June 4, 1923
1,527,469
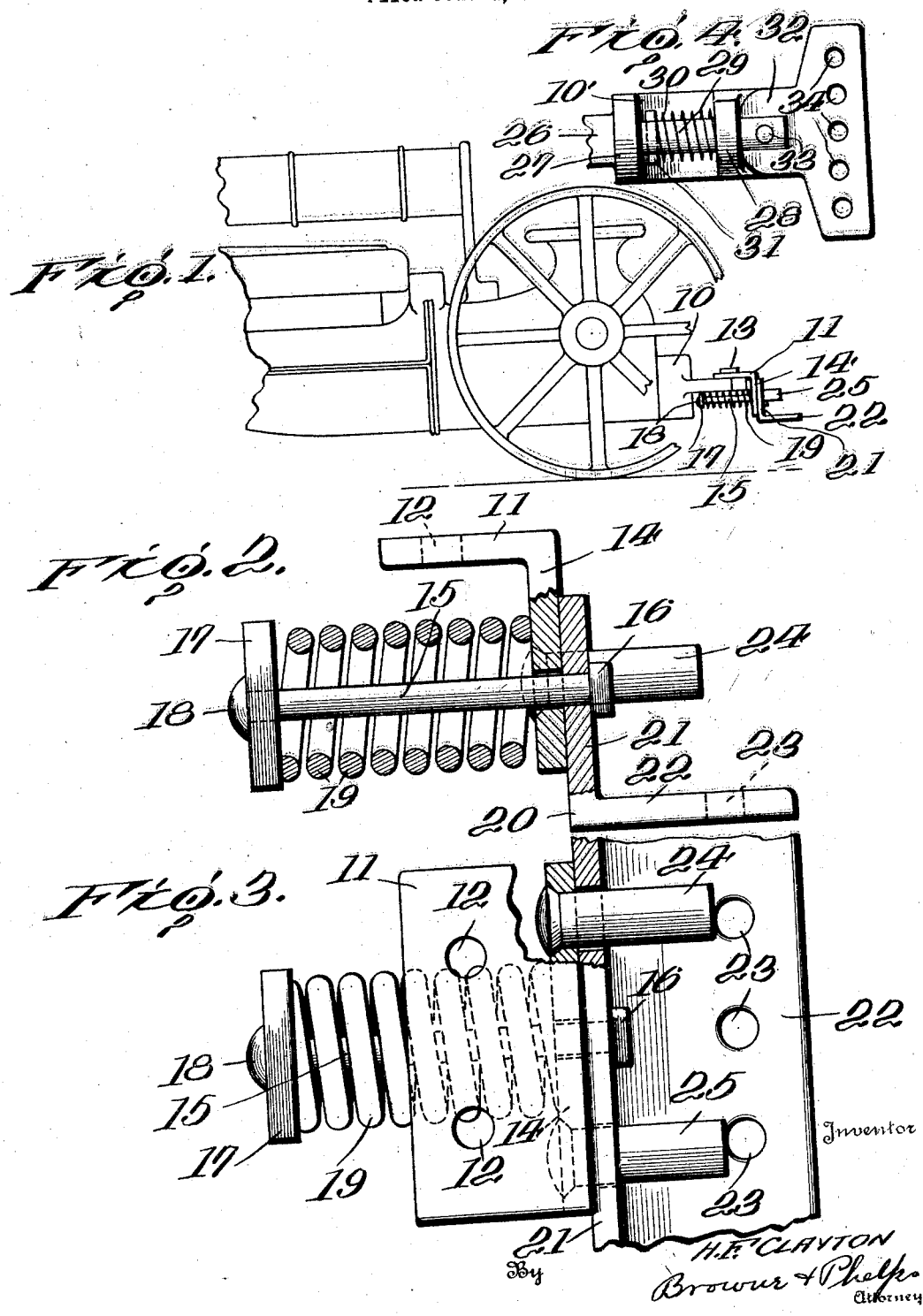

Patented Feb. 24, 1925.

1,527,469

UNITED STATES PATENT OFFICE.

HOWARD F. CLAYTON, OF ROANOKE, LOUISIANA.

DRAFT GEAR FOR TRACTORS.

Application filed June 4, 1923. Serial No. 643,311.

*To all whom it may concern:*

Be it known that I, HOWARD F. CLAYTON, a citizen of the United States, residing at Roanoke, in the parish of Jefferson Davis and State of Louisiana, have invented certain new and useful Improvements in Draft Gears for Tractors, of which the following is a specification.

The invention relates to draft gear, and has as an object the provision of a gear adapted to lower the application of traction to the tractor so as to lessen the tendency to overturn. A further object of the invention is the provision of a device of the character described adapted to cushion the shocks of starting the load. A further object of the invention is the provision of a device of the character described that may be readily applied to existing structures, and which will accomplish its objects by means of a simple structure.

Illustrative embodiments of the invention are shown in the accompanying drawings, in which—

Fig. 1, is a detail side view of a tractor shown diagrammatically, with an embodiment of the invention applied thereto.

Fig. 2 is a detail side elevation, partly broken away, of a form of the device shown upon a larger scale than that of Fig. 1.

Fig. 3 is a detail plan view, partly broken away, of the embodiment shown in Fig. 2.

Fig. 4 is a bottom plan view of a modification.

As shown in Fig. 1, the device may be applied to the usual hitch device 10, with which the Fordson tractor is equipped at the factory.

In Figs. 1 to 3 inclusive the device comprises an angle member 11, perforated at 12 for reception of bolts 13 to secure the device to the hitch element 10. The vertical member 14 of the angle is shown as perforated for passage of a draft bolt 15 secured therein by means of its nut 16 and having an abutment plate 17 coacting with its head 18.

For the purpose of cushioning the shocks of starting loads there is shown a helical spring 19 abutting against the vertical member 14 of the angle 11 and against the plate 17. To transmit traction from the tractor there is shown a second angle member or hitching bar 20 having its vertical member 21 perforated for reception of the bolt 15 and its horizontal member 22 perforated with a plurality of holes 23 adapted to receive any desirable connecting device for attachment of the load, as for instance an ordinary clevis, not shown. By provision of the plurality of holes 23 in the horizontal member 22 the load may be secured to the member 20 through a range of horizontal adjustment to cause the drawn implement or vehicle to vary its line of travel from the track of the wheels of the tractor. To guide the movement of the member 20 when the spring 19 is compressed and maintain the same in parallelism with the member 14 of the angle 11, there are shown pins 24, 25 fixed in the portion 14 of the angle 11 upon which the member 21 is adapted to slide.

In the modification of Fig. 4 there is shown a device adapted to replace the hitch 10 with which the tractor is equipped normally. As there shown, a member 10' is provided with a shank 26, which may be screw threaded or otherwise prepared for securing to the tractor. A pair of flanges 27, 28 are shown formed on the lower side of the device, flange 28 being perforated for passage of a draft bolt 29. To cushion the shocks of starting in this form of the device there is shown a helical spring 30 having an abutment against a pin 31 passing through the bolt. A draft plate 32 is shown pivotally secured to the bolt 29, as by means of a pin 33, by virtue of which arrangement the plate 32 may swing as the drawn implement or vehicle rounds curves in compliance with the direction taken by the tractor. A plurality of holes 34 are provided in the draft plate 32 for hitching purposes.

The operation of the device will be obvious from the above description.

Minor changes may be made in the physical embodiment of the invention without departing from its spirit.

I claim:

A draft gear comprising, in combination, an angle member having a horizontal leg perforated for reception of attaching bolts, and a vertical member having a perforation for a draft bolt, a pair of spaced guiding pins projecting rearwardly from said vertical leg, a draft bolt freely slidable in said perforation and having an abutment plate, a helical spring compressed between said vertical leg and said abutment plate, an angle member having its vertical legs secured to said draft bolt and having perforations freely slidable over said pins, the horizontal leg of said member having a plurality of laterally spaced perforations for attachment of a rod in a lateral adjusted position.

HOWARD F. CLAYTON.